United States Patent
Miller et al.

(10) Patent No.: US 7,178,285 B2
(45) Date of Patent: Feb. 20, 2007

(54) FUNCTIONAL SUBSTRATES FOR GROWTH OF CULINARY AND MEDICINAL MUSHROOMS

(75) Inventors: Andrew H. Miller, Calistoga, CA (US); Donald Jerry Kinoshita, San Luis Obispo, CA (US); Roger Allen Drummer, Los Angeles, CA (US)

(73) Assignee: Functional Fungi, LLC, Arroyo Grande, CA (US)

( * ) Notice: Subject to any disclaimer, the term of this patent is extended or adjusted under 35 U.S.C. 154(b) by 0 days.

(21) Appl. No.: 11/029,634

(22) Filed: Jan. 5, 2005

(65) Prior Publication Data

US 2005/0178055 A1 Aug. 18, 2005

Related U.S. Application Data

(60) Provisional application No. 60/534,334, filed on Jan. 5, 2004.

(51) Int. Cl.
*A01G 1/04* (2006.01)
(52) U.S. Cl. ......................................................... 47/1.1
(58) Field of Classification Search ................... 47/1.1; 71/5; 424/195.15
See application file for complete search history.

(56) References Cited

U.S. PATENT DOCUMENTS

| | | | | |
|---|---|---|---|---|
| 2,338,259 | A | * | 1/1944 | Granville .......................... 71/5 |
| 4,617,047 | A | | 10/1986 | Bretzloff |
| 4,764,199 | A | | 8/1988 | Pratt et al. |
| 4,776,872 | A | | 10/1988 | Mulleavy et al. |
| 4,852,297 | A | * | 8/1989 | Moren ............................ 47/1.1 |
| 5,291,685 | A | | 3/1994 | Romaine et al. |
| 5,427,592 | A | * | 6/1995 | Romaine et al. ............... 47/1.1 |
| 5,514,191 | A | * | 5/1996 | Miller et al. ................... 47/1.1 |
| 5,979,109 | A | | 11/1999 | Sartor et al. |
| 6,298,598 | B1 | | 10/2001 | Wach et al. |
| 6,569,475 | B2 | | 5/2003 | Song et al. |
| 6,737,065 | B2 | | 5/2004 | Song et al. |
| 6,747,065 | B1 | | 6/2004 | Paszkowski |
| 2004/0258711 | A1 | * | 12/2004 | Shastri et al. ........... 424/195.15 |
| 2005/0178055 | A1 | * | 8/2005 | Miller et al. ................... 47/1.1 |

FOREIGN PATENT DOCUMENTS

| | | | | |
|---|---|---|---|---|
| EP | | 435798 A | * | 7/1991 |
| JP | | 2002045034 A | * | 2/2002 |
| WO | WO2005/067581 | A2 | * | 7/2005 |

OTHER PUBLICATIONS

Darby et al., Early Corn Problems During a Cool, Wet Spring Conditions (last updated Oct. 4, 2003), The University of Vermont, Department of Plant and Soil Sciences.*
Functional Fungi, About Us, (earliest publication date on the internet not yet determined), http://www.functionalfungi.com/about.htm.*
Organic Pharmacy, Purple Corn Reishi Antler (1994-2006), http://organicpharmacy.org/products/Purple.Corn.Reishi.Antler/SKU:MF-80100.*
Mega Food Advertisement, (last updated 2005), Organic Purple Kculli Corn, www.megafood.com.*

* cited by examiner

*Primary Examiner*—Francis T. Palo
(74) *Attorney, Agent, or Firm*—The Webb Law Firm

(57) ABSTRACT

Methods of increasing the amount of one or more functional compounds in medicinal mushroom biomass and mushroom mycelia by growing the mushrooms on a substrate that is high in the functional compound or compounds of interest is provided. More specifically, a method of increasing the amount of anthocyanins in mushrooms is provided. Mushrooms are grown on a substrate rich in anthocyanins, such as purple corn or other suitable red, purple or black-pigmented substrate, and incorporate the anthocyanins during growth. Mushrooms grown by this method, as well as methods of improving the growth rate and potency of mushrooms, are also provided.

21 Claims, 1 Drawing Sheet

FUNCTIONAL SUBSTRATES FOR GROWTH OF CULINARY AND MEDICINAL MUSHROOMS

CROSS-REFERENCE TO RELATED APPLICATION

This application claims priority to provisional application Ser. No. 60/534,334, filed Jan. 5, 2004.

BACKGROUND OF THE INVENTION

1. Field of the Invention

This invention relates to substrates for use in growing mushrooms and methods of increasing the growth rate of mushrooms. Specifically, functional substrates having desirable compounds can be used to grow mushrooms, to increase the levels of these compounds in mushrooms and to improve the growth rate of the mushrooms. Additionally, functional substrates increase the potency of naturally occurring compounds already present in the mushrooms.

2. Background Information

In the commercial method of producing mushrooms, a suitably prepared substrate such as corn, rice, millet or rye is impregnated with mushroom spores or previously collected mushroom mycelia. Under sterile lab conditions, the spores or mycelia are injected into the substrate, which has been prepared by soaking the grain in water and sterilizing it. Mycelia are the filamentous hyphen of a mushroom that collect water and nutrients to enable mushrooms to grow. The grains are incubated to promote full colonization of the mycelia, at which point the mycelia-laced grains are known as "spawn". Spawning is usually done in a plurality of individual spawn bags. The substrate provides the nutrients necessary for mycelium growth. The mycelium-impregnated substrate is then allowed to develop under carefully controlled conditions of temperature and moisture, until the hyphen of the mycelium have permeated the substrate. This process usually takes anywhere from three to four weeks for the mycelium to fully colonize the spawn bag. The spawn bag is allowed to continue to grow until the mycelium enriched product can be harvested between four to eight weeks from the beginning of the process. Typically, mushroom growers purchase spawn or grow it themselves from agar plates, as will be known to one skilled in the art. In the commercial production of medicinal mushrooms, the spawn bag is the final product, which is then sold or the contents processed into dry powdered product.

Many mushrooms are known to have medicinal properties. For example, the mistake mushroom (*Grifola frondosa*) contains grifolan, an important beta-glucan polysaccharide and has been shown to activate macrophages, an important component of the immune system. Laboratory studies have shown that mistake extract can block the growth of cancer tumors and boost the immune function of mice with cancer.

It has also been found that shiitake mushrooms possess beneficial properties. A specific amino acid in shiitake helps speed up the processing of cholesterol in the liver. Shiitake also appears to be a formidable cancer fighter. A polysaccharide compound called lentinan has been isolated from shiitake, and in laboratory trials, lentinan appears to stimulate immune-system cells to clear the body of tumor cells. Shiitake appears to be effective against some of the more serious viruses, such as HIV and hepatitis B.

Reishi mushrooms have been used in China and Japan for years as a medicine for liver disorders, hypertension, and arthritis, and researchers have found that reishi has anti-allergic, anti-inflammatory, anti-viral, anti-bacterial, and antioxidant properties. In vitro experiments also indicate that reishi may help fight cancer tumors.

U.S. Pat. No. 6,747,065 describes methods of producing mushroom mycelia rich in trace minerals by culturing the mycelia in a broth to which supplements have been added.

It would be desirable to improve or enhance the medicinal properties of these and other mushrooms, and shorten the growing time for commercial purposes.

SUMMARY OF THE INVENTION

The present invention accomplishes the above by providing in a general aspect a method of increasing the amount of one or more functional compounds in mushrooms by growing the mushrooms on a substrate that is high in the functional compound or compounds of interest. The term "functional compound", as used herein, means a compound known to one skilled in the art to have certain medicinal or other beneficial properties, such as antioxidant, anti-tumorigenic, antidiabetic, antiviral, and the like. It has been found that growing mushrooms on substrates that have high levels of the compounds of interest permits uptake of the compounds by the mushrooms during the growth cycle, and these levels are maintained during further processing of the mushrooms. Thus, in one aspect, the present invention provides a method of increasing the amount of anthocyanins in medicinal mushroom biomass and mushroom mycelia. The method comprises providing a substrate having one or more anthocyanins therein and growing mushrooms on the substrate. In additional aspects, the present invention provides methods of increasing certain other compounds in medicinal mushroom biomass and mushroom mycelia such as selenium or beta glucans, by providing a substrate high in these compounds and growing the mushrooms on the substrate.

In a further aspect, the present invention provides a method of decreasing the growing time of mushrooms, by providing a substrate rich in anthocyanins. The mushrooms are grown on the anthocyanin-rich substrate, and the time to fruiting is decreased as compared to growing time on substrates not having anthocyanins.

In yet a further aspect, the present invention provides a method of increasing the potency of naturally-occurring compounds found in medicinal mushroom biomass. The method comprises providing a substrate high in anthocyanins, and growing the mushrooms on the substrate.

In an additional aspect, the present invention provides a method of increasing the amount of anthocyanins in dried mushroom biomass, comprising providing dried mushroom biomass, and subjecting the dried mushroom biomass to heat treatment.

These and other aspects of the present invention will become more readily apparent from the following figure, detailed description and appended claims.

DETAILED DESCRIPTION OF THE INVENTION

Figure 1:
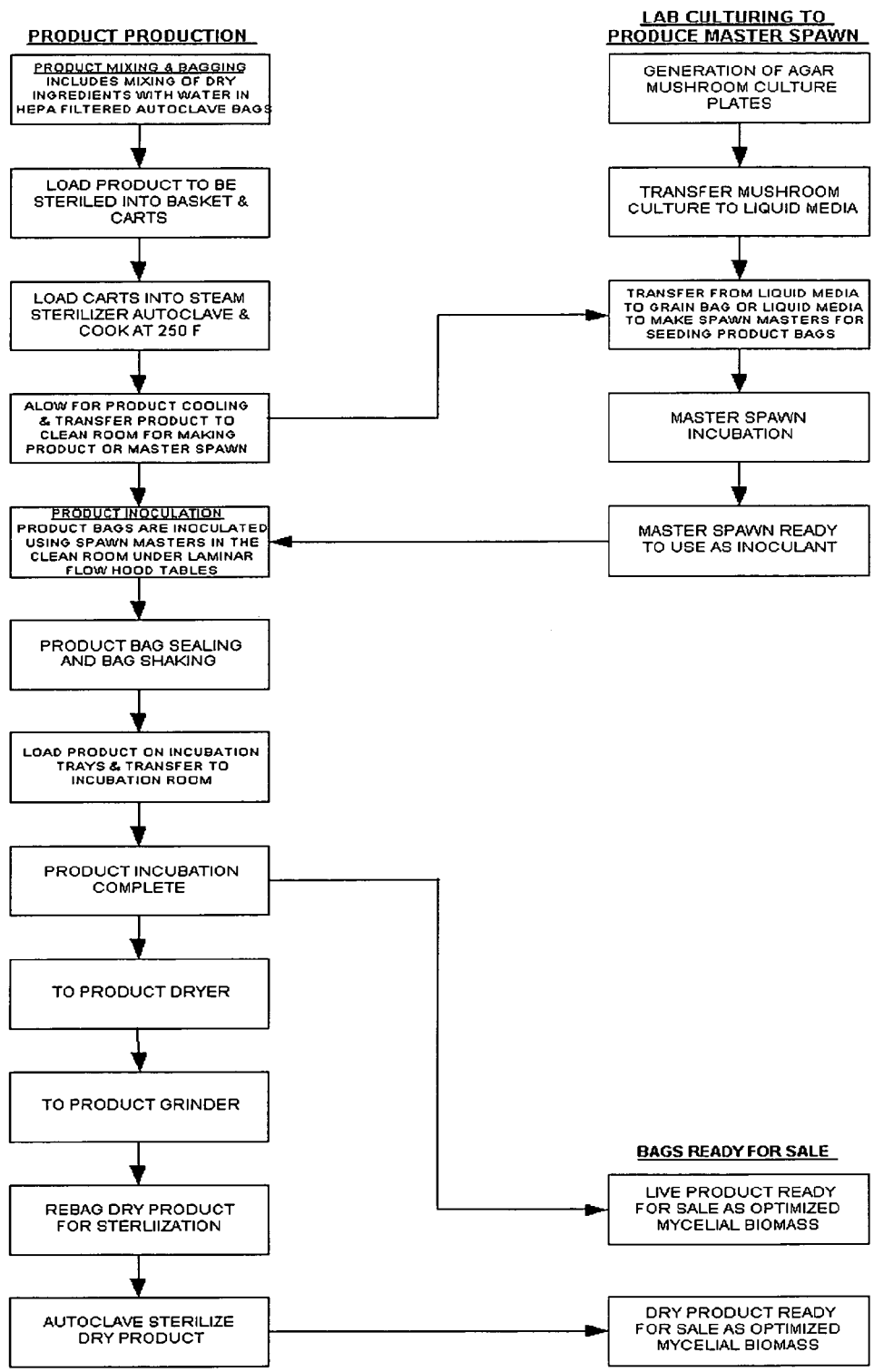
FIG. 1 is a flow chart illustrating the culturing of mushrooms according to a method of the present invention.

Thus, in one aspect the present invention provides a method of increasing the amount of one or more functional compounds in medicinal mushroom biomass and mushroom mycelia by growing mushrooms on a substrate that is high in the functional compound or compounds of interest. Examples of "functional compounds" include compounds known to have antioxidant properties including, but not limited to, anthocyanins; compounds known to have antitumor properties including, but not limited to, beta glucans; selenium, ganoderic acid; triterpenes; and cordycepin.

As used herein, the term "mushroom biomass" refers to mushroom mycelia, fruiting bodies, spawn, or other life cycle stage of a mushroom, alone or in combination with each other or in combination with the substrate on which the mushroom is grown, including the functional substrates described herein. "Medicinal mushroom" refers to the varieties of mushrooms grown for their desired medicinal properties or compounds, as is known in the art.

Thus, in an additional aspect, the present invention provides a method of increasing the amount of anthocyanins in medicinal mushroom biomass and mushroom mycelia comprising providing a substrate having one or more anthocyanins therein; and growing mushrooms on the substrate.

Anthocyanins are well known in the art, and are naturally occurring compounds that are responsible for the red, purple, and blue colors of many fruits, vegetables, cereal grains, and flowers. For example, the colors of berry fruits, such as blueberries, bilberries, strawberries, raspberries, boysenberries, marionberries, cranberries, are due to many different anthocyanins. Over 300 structurally distinct anthocyanins have been identified in nature. Because anthocyanins are naturally occurring, they have attracted much interest for use as colorants for foods and beverages. Recently, the interest in anthocyanin pigments has intensified because of their possible health benefits as dietary antioxidants. For example, anthocyanin pigments of bilberries (*Vaccinium myrtillus*) have long been used for improving visual acuity and treating circulatory disorders. There is experimental evidence that certain anthocyanins and flavonoids have anti-inflammatory properties. In addition, there are reports that orally administered anthocyanins are beneficial for treating diabetes and ulcers and may have antiviral and antimicrobial activities. The chemical basis for these desirable properties of flavonoids is believed to be related to their antioxidant capacity. Thus, the antioxidant characteristics associated with berries and other fruits and vegetables have been attributed to their anthocyanin content.

Proanthocyanins are another class of flavonoid compounds that are found in fruits and vegetables and, while being colorless, have antioxidant activities. As used herein, the term "anthocyanins" will refer to naturally occurring and synthetic anthocyanins and proanthocyanins, as those terms are understood in the art.

Suitable substrates for growing mushrooms include grains having high levels of anthocyanins, as noted by the color of the grain. By way of example, certain varieties of corn such as purple corn and black corn have high levels of anthocyanins. Purple barley and purple or black rice varieties are also known to contain high levels of anthocyanins.

Any variety of mushroom will benefit from the methods of the present invention, although due to the intended end use of the mushrooms the variety must be edible by humans. Suitable varieties include, but are not limited to, *Coriolus versicolor, Ganoderma lucidum, Schizophyllum commune, Pleurotus ostreatus, Agaricus blazei, Lentinula edodes, Flammulina velutipes, Grifola frondonsus*, and *Codyceps sinensis*.

In an additional aspect, the present invention provides a method of increasing the amount of selenium in medicinal mushroom biomass and mushroom mycelia comprising providing a substrate having selenium therein; and growing the mushrooms on the substrate. Substrates suitable for growing mushrooms and having high levels of selenium include, but are not limited to, certain varieties of wheat such as *triticum teranicum*.

In yet a further aspect, the present invention provides a method of increasing the amount of beta-glucan in medicinal mushroom biomass and mushroom mycelia comprising: providing a substrate having beta glucan therein; and growing the mushrooms on the substrate. Beta-glucans are a family of polysaccharides known in the art for having antitumor properties, cholesterol lowering ability, and other beneficial properties. Substrates having high levels of beta-glucans include, but are not limited to, certain varieties of barley such as waxy hulless barley.

In a further aspect, the present invention provides a method of decreasing the growing time of mushrooms, by providing a substrate rich in anthocyanins. Suitable substrates are those as described above. The mushrooms are grown on the anthocyanin-rich substrate, and the time to spawning and fruiting is decreased as compared to growing time on substrates not having anthocyanins. It has been found that the growing time can be decreased by 20–25%, using the methods of the present invention. This provides a significant advantage and benefit in the commercial production of mushrooms.

In an additional aspect, the present invention provides a method of increasing the potency of naturally-occurring medicinal compounds in mushrooms comprising: providing a substrate high in anthocyanins, and growing the mushrooms on the substrate. Preferably, the substrate is purple or black corn.

As used herein, the term "increased potency" means increased levels or amounts of the naturally occurring medicinal compounds found in mushrooms. It has been found that growing mushrooms on substrates high in anthocyanins such as purple corn or other purple or black pigmented grain has the unexpected benefit of increasing the amounts of certain desirable compounds already present in medicinal mushrooms, including, but not limited to, triterpenes, ganoderic acid, cordycepin, adenosine, and hydroxyethyl-adenosine.

The substrate is prepared for each individual spawn bag. The spawn bags are designed with a high efficiency particulate air (HEPA) filter and can be autoclave heat sterilized. The HEPA filter on the spawn bag allows the bag to breathe and protects the substrate from contamination. Each spawn bag contains 5 pounds of prepared substrate consisting of a batch mix of about 3 pounds grain with about 2 pounds water. The unsealed spawn bags are then autoclave steam sterilized up to a temperature of about 250° F. (approximately 15 psig) for a period of about 4–5 hours. The cook time is the time that steam is supplied and shutdown to the autoclave. HEPA-filtered clean air is then applied for rapid cooldown of the autoclave. The cooking time is determined by monitoring the inner core temperatures of the spawn substrate. Following autoclaving to sterilize the substrate, the spawn bags are then inoculated with spawn. The spawn bags are then heat sealed and the bags gently tumbled by machine or by hand to evenly distribute the spawn throughout the substrate. Thorough mixing may take a few seconds to a minute. Clean room conditions must be maintained during the process to prevent contamination of the substrate. The spawn bags are allowed to spawn run and mature for a period of about 1–2 months, after which time the mycelium-enriched spawn bags are harvested. The live (fresh) product can be sold by individual spawn bags without opening (or harvesting) the bags. If a dry product is desired, the spawn bags are opened and the live product contents are spread out on dryer trays. The product is evenly distributed across the dryer tray with less than about 1" height. The dryer trays are loaded into a convection air dryer. The air temperature of the dryer may be adjusted from ambient room temperature to about 190° F. Usually the air temperatures are set to control around 150–170° F. and drying times are automatically set from 16–20 hours. The air temperatures can be set lower, requiring longer dry times. Freeze drying or vacuum drying may be used as alternative drying methods. The final dried product is tested to have a less than or equal to about 5% by weight moisture content. Each spawn bag initially weighing 5 pounds (water and grain mix) is designed to produce slightly greater than 1 kg of dry product.

The dry product is powdered using a grinder with 40 mesh or finer screen. The powder is then packaged into 3 kg plastic bags and the bags are sealed. The bags are then autoclaved for final sterilization for up to approximately 15 hours, at temperatures between about 200° F. to about 270° F. (approximately 15 psig), depending on the amount of moisture removed during the drying step and other factors. Due to the low moisture content of the dry product, sterilization will take longer. Since the bags are sealed prior to sterilization, regulated air pressure is added to the autoclave during steam shutdown to avoid depressurization of the autoclave. This will prevent bags from being damaged due to the core temperatures in the bag unable to cool as fast as the pressure can decline based on temperature and pressure thermodynamic principles. Once the product is cooled, the product can be removed from the autoclave.

Surprisingly, it has been found that the final heat treatment step increases the amount of anthocyanins present in the dried mushroom biomass. Without wishing to be bound by any theory, it is thought that the heat treatment improves the bioavailability of the anthocyanins by releasing them from a bound form. Thus, in an additional aspect, the present invention provides a method of increasing the amount of anthocyanins in dried mushroom biomass, comprising providing dried mushroom biomass, and subjecting the dried mushroom biomass to heat treatment. Preferably, the heat treatment is carried out for a period of up to about 15 hours, although shorter time intervals may increase the amount of anthocyanins to a lesser extent. Also preferably, the heat treatment is carried out at temperatures of between about 200° F. to about 270° F., depending on the moisture content of the dried mushroom biomass and other factors, as will be understood by one skilled in the art. Autoclaving or any other suitable method of heat treatment can be used.

EXAMPLES

The following examples are intended to illustrate the invention and should not be construed as limiting the invention in any way.

Specimens of *Ganoderma lucidum* were grown on purple corn by the methods known in the art and generally described above and shown in the flow chart in FIG. 1. Sample A, *Ganoderma lucidum* (GL) grown on purple corn was tested prior to the final sterilization/heat treatment step for the presence of anthocyanins.

The results are shown in Table 1.

TABLE 1

| *Ganoderma lucidum* (grown on purple corn) GL-Sample A | | |
|---|---|---|
| Analyte | Result | Unit |
| Pelargonidin | 0.0022 | mg/g |
| Peonidin | 0.0018 | mg/g |
| Cyanidin | 0.0001 | mg/g |
| Petunidin | 0.0001 | mg/g |
| Malvidin | 0.0000 | mg/g |
| Delphinidin | 0.0001 | mg/g |

Sample B was prepared as above, including the final sterilization/heat treatment for about 10 hours at 250° F. Results are presented in Table 2.

TABLE 2

| *Ganoderma lucidum* (grown on purple corn) GL-Sample B | | |
|---|---|---|
| Analyte | Result | Unit |
| Pelargonidin | 0.0134 | mg/g |
| Peonidin | 0.0579 | mg/g |
| Cyanidin | 0.0121 | mg/g |
| Petunidin | 0.0203 | mg/g |
| Malvidin | 0.0065 | mg/g |
| Delphinidin | 0.0078 | mg/g |

Table 3 shows the results of live reishi antler (the fruiting body of *Ganoderma lucidum*) grown on purple corn, with no further processing. As can be seen in these tables, anthocyanins were present in all three samples grown on purple corn. Mushrooms grown on other nonpigmented grains such as rice have undetectable levels of anthocyanins. Additionally, the heat treatment appears to increase the bioavailability of the anthocyanins in the mushrooms.

TABLE 3

| *Ganoderma lucidum* (Reishi antler grown on purple corn) GL-Sample C | | |
|---|---|---|
| Analyte | Result | Unit |
| Pelargonidin | 0.0086 | mg/g |
| Peonidin | 0.0379 | mg/g |
| Cyanidin | 0.0155 | mg/g |
| Petunidin | 0.0024 | mg/g |
| Malvidin | 0.0011 | mg/g |
| Delphinidin | 0.0193 | mg/g |

All anthocyanin analysis was performed by methodology employed by Krawczyk, U., Petri, G., "Application of RP [reversed-phase]-HPLC and spectrophotometry in standardization of bilberry anthocyanoside extract" as published in Arch. Pharm. 1992, 325 (3), pp. 147–149 using Partisil 10 ODS (25 cm*4.6 mm) with gradient elution (0.5 ml min−1) with formic acid–acetonitrile (100:0 to 0:1 in 60 min then held to 90 min) and detection at 280 nm. Identification/quantification by external standards method; standard obtained from Sigma-Aldrich.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of increasing the amount of anthocyanins in medicinal mushroom biomass and mushroom spawn comprising:
   providing a substrate having one or more anthocyanins therein; and
   growing mushrooms on the substrate, wherein said medicinal mushroom biomass and mushroom spawn have an increased amount of anthocyanins therein.

2. The method of claim 1, wherein the substrate is a variety of corn having one or more anthocyanins.

3. The method of claim 2, wherein the substrate is purple corn.

4. The method of claim 2, wherein the substrate is black corn.

5. The method of claim 1, wherein the substrate is purple barley.

6. The method of claim 1, wherein the substrate is purple rice.

7. A mushroom grown by the method of claim 1.

8. A mushroom grown by the method of claim 3.

9. A method of decreasing the cultivation period of medicinal mushroom biomass and mushroom spawn comprising:
   providing a substrate having one or more anthocyanins therein; and
   growing the mushrooms on the substrate, wherein said medicinal mushroom biomass and mushroom spawn have a decreased cultivation period.

10. The method of claim 9, wherein the substrate is a variety of corn having one or more anthocyanins.

11. The method of claim 10, wherein the substrate is purple corn.

12. The method of claim 10, wherein the substrate is black corn.

13. The method of claim 9, wherein the substrate is purple barley.

14. The method of claim 9, wherein the substrate is purple rice.

15. A method of increasing the potency of naturally occurring compounds in medicinal mushroom biomass and mushroom mycelia comprising:
   providing a substrate having one or more anthocyanins therein; and
   growing mushrooms on the substrate, wherein said medicinal mushroom biomass and mushroom mycelia have an increased potency of naturally occurring compounds therein.

16. The method of claim 15, wherein the substrate is a variety of corn having one or more anthocyanins.

17. The method of claim 16, wherein the substrate is purple corn.

18. The method of claim 15, wherein the substrate is black corn.

19. The method of claim 15, wherein the substrate is purple barley.

20. The method of claim 15, wherein the substrate is purple rice.

21. A method of increasing the potency of naturally occurring compounds in medicinal mushroom biomass and mushroom spawn comprising:
   providing a substrate having one or more anthocyanins therein; and
   growing mushrooms on the substrate, wherein the growing time of the medicinal mushroom biomass and mushroom spawn is decreased by 20–25%.

* * * * *

UNITED STATES PATENT AND TRADEMARK OFFICE
CERTIFICATE OF CORRECTION

PATENT NO. : 7,178,285 B2  Page 1 of 1
APPLICATION NO. : 11/029634
DATED : February 20, 2007
INVENTOR(S) : Miller et al.

It is certified that error appears in the above-identified patent and that said Letters Patent is hereby corrected as shown below:

Column 8, Line 20, Claim 18, "The method of Claim 15" should read
-- The method of Claim 16 --

Signed and Sealed this

Twenty-sixth Day of June, 2007

JON W. DUDAS
*Director of the United States Patent and Trademark Office*